Jan. 11, 1966 Z. D. REYNOLDS 3,229,228
ADJUSTABLE FREQUENCY WIEN-BRIDGE OSCILLATOR
Filed Sept. 25, 1962 2 Sheets-Sheet 1

INVENTOR.
ZACK D. REYNOLDS
BY
ATTORNEYS

ADJUSTABLE FREQUENCY WIEN-BRIDGE OSCILLATOR

Filed Sept. 25, 1962 2 Sheets-Sheet 2

INVENTOR.
ZACK D. REYNOLDS
BY
ATTORNEYS

United States Patent Office 3,229,228
Patented Jan. 11, 1966

3,229,228
ADJUSTABLE FREQUENCY WIEN-BRIDGE OSCILLATOR

Zack D. Reynolds, San Jose, Calif., assignor to the United States of America as represented by the Secretary of the Navy Filed Sept. 25, 1962, Ser. No. 226,784
4 Claims. (Cl. 331—141)
(Granted under Title 35, U.S. Code (1952), sec. 266)

The invention described herein may be manufactured and used by or for the Government of the United States of America for governmental purposes without the payment of any royalties thereon or therefor.

This invention relates generally to oscillators and more particularly to an improved adjustable frequency Wien-bridge oscillator.

The conventional Wien-bridge oscillator circuit is illustrated in FIG. 1. It employs a bridge circuit and a non-inverting amplifier having two feedback networks, one regenerative, the other degenerative. The negative feedback network is frequency insensitive, however, the positive or regenerative network is frequency sensitive and at one particularly frequency, depending on the values of the components in the bridge, the positive feedback voltage is exactly in phase with the output voltage from the amplifier.

The degenerative feedback is provided by the $R_1R_1$ network and is not frequency selective. The regenerative feedback is provided by the $R_2C_1R_3C_2$ network and is frequency selective. With $R_2$ equal to $R_3$ and $C_1$ equal to $C_2$, the regenerative feedback voltage is exactly in phase with the amplifier output voltage. The frequency at which the circuit oscillates is $$f=\frac{1}{2\pi R_2C_1}$$

At this frequency the regenerative feedback voltage just equals or barely exceeds the degenerative feedback voltage and the regenerative feedback voltage is of the proper phase to sustain oscillation. At frequencies below or above this frequency the degenerative feedback voltage is larger than the regenerative feedback voltage so the resultant degeneration of amplifier suppresses these frequencies.

If the frequency of this oscillator is adjusted at all, it is usually adjusted by varying $C_1$ and $C_2$, or $R_2$ and $R_3$. Variation of $R_2$ and $R_3$ significantly changes the output impedance of the oscillator and as a result the capacitors are usually varied. At low frequencies, $C_1$ and $C_2$ are large and difficult to vary continuously. It is also difficult (and sometimes impossible) to shape the capacitor plates so the frequency can vary as a chosen function of control motion, such as $f_{out}=f_0(1\pm K\ \sin^{\theta})$, where $\theta$ is the rotation of the frequency control knob.

It is an object of the invention to provide an improved oscillator with a large adjustable frequency range and good amplitude stability.

It is another object of the present invention to provide an improved oscillator wherein only one component is varied and the frequency can vary as a chosen function of control motion.

These and other objects of the invention will become more clearly apparent from the following description when taken in conjunction with the accompanying drawings.

Referring to the drawings.

Figures 4, 5, 6, 7:
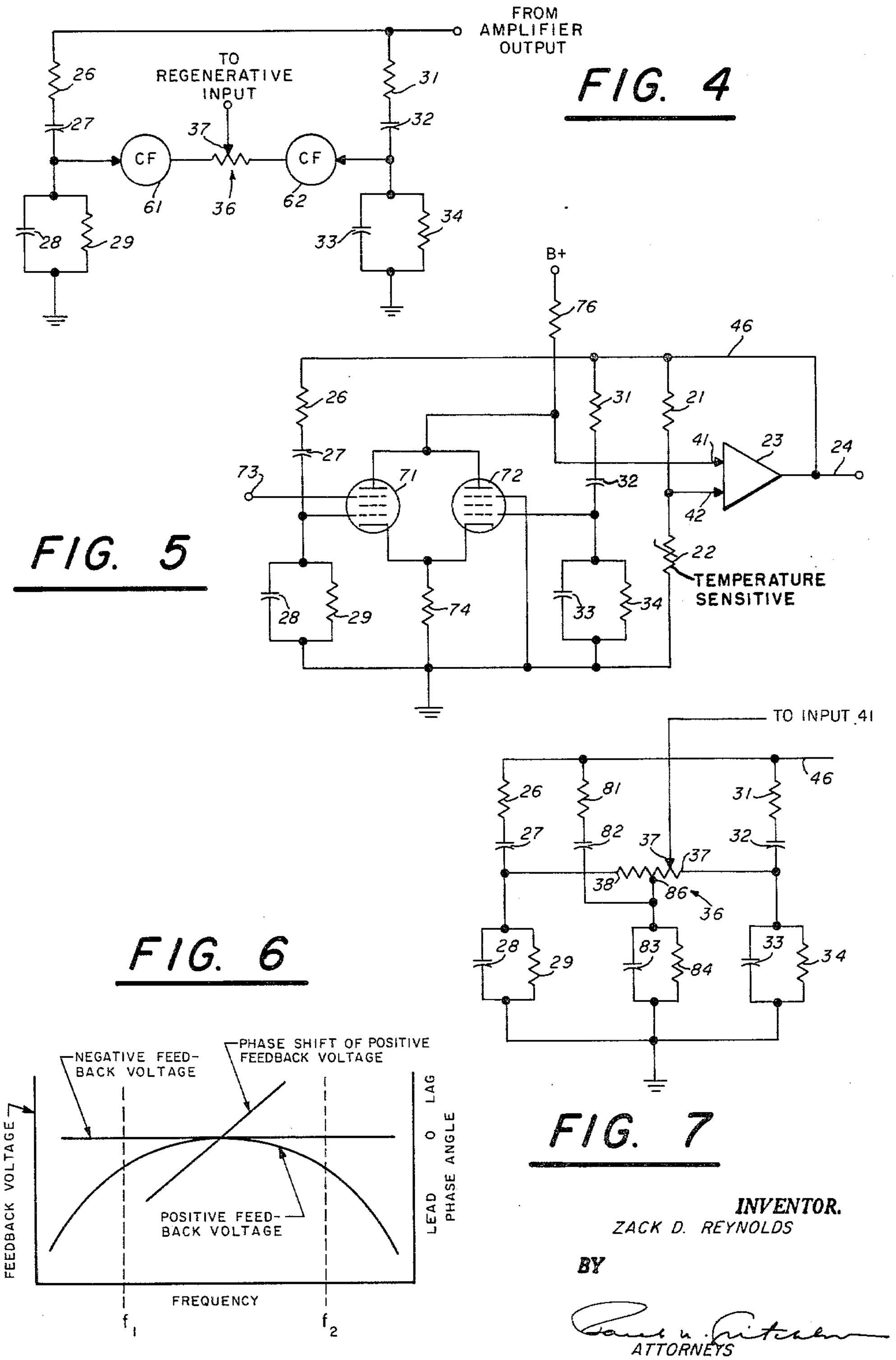
FIG. 4 shows how the potentiometer may be isolated from the networks.
FIG. 5 illustrates a modified apparatus according to the invention employing an electronic mixing circuit.

FIG. 6 graphically depicts the feedback voltages; and

FIG. 7 schematically illustrates an exemplary circuit employing more than two series-parallel networks.

Figure 1:
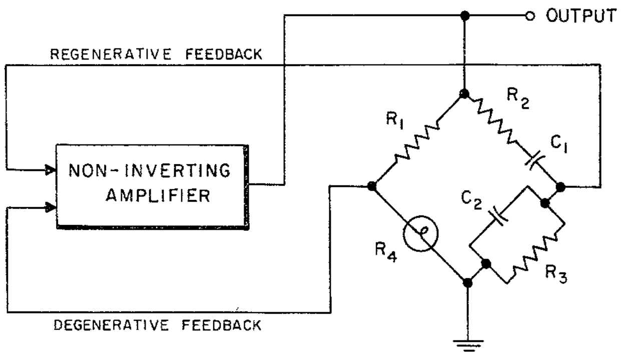
FIG. 1 (PRIOR ART)
FIG. 1 is a diagram of a prior art Wien-bridge oscillator.
Figure 2:
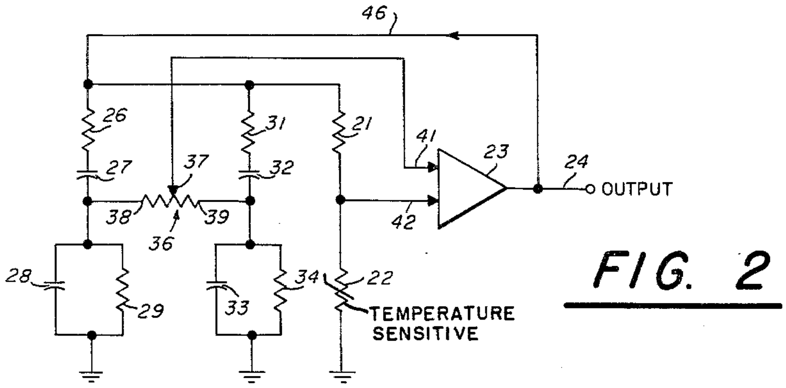
FIG. 2 is a block diagram illustrating the principles of the oscillator in accordance with the invention.

The oscillator of FIG. 2 is equipped with a non-inverting amplifier 23 having inputs 41 and 42 and output 24. Resistor 21 and nonlinear resistor 22 form a degenerative feedback network. The remaining resistors and capictors illustrated in FIG. 2 form a regenerative feedback network. The positive feedback network is comprised of two series-parallel circuits of similar configuration which are connected by potentiometer 36. The resistances of resistors 26 and 29 are identical and the capacitances of capacitors 27 and 28 are identical. The resistive values of resistors 31 and 34 are identical and the capacitive values of capacitors 32 and 33 are identical. A positive feedback voltage is removed at wiper or sliding contact 37 and fed to input 41 of amplifier 23.

Lead 46 enables the output voltage of amplifier 23 to be fed back to both series-parallel circuit configurations as well as the voltage divider comprising resistor 21 and nonlinear resistor 22. Nonlinear resistor 22 has a positive-temperature coefficient. As a result, as the current in resistor 22 increases, the resistance also increases. As there is no phase shift across the voltage divider, and since the resistances are practically constant for all frequencies, the amplitude of the negative feedback voltage is constant for all the frequencies that may be present in the output of amplifier 23. A curve of the negative feedback voltage is plotted in FIG. 6.

The series-parallel network comprising resistors 26 and 29 and capacitors 27 and 28 is frequency selective. A positive feedback voltage is produced at the junction of capacitors 27 and 28 that varies in amplitude and phase with frequency. At one specific frequency this positive feedback voltage is equal to or in excess of the negative feedback voltage produced on input 42 and is of the exact phase of the output voltage from amplifier 23. That frequency, call it $f_1$, is equal to $$\frac{1}{2\pi R_{26}C_{27}}$$

For frequencies above and below $f_1$ the positive feedback voltage is of less magnitude than the negative feedback voltage produced on input 42. Similarly, a positive feedback voltage is produced at the junction of capacitor 32 and 33 in the series-parallel network comprising the resistors 31 and 34 and capacitors 32 and 33. At one particular frequency, $f_2$, the positive feedback voltage at the junction of capacitors 32 and 33 is equal to or in excess of the negative feedback voltage at input 42. The frequency $f_2$ is equal to $$\frac{1}{2\pi R_{31}C_{32}}$$

and is in phase with the amplifier output voltage. The values of the resistors and capacitors in the two series-parallel networks are chosen so that $f_1$ and $f_2$ are the limits of the range desired to be covered by the oscillator.

The positive feedback voltage junctions described above are interconnected by the full resistance of single potentiometer 36. A positive feedback voltage is removed from the two series-parallel networks by wiper 37 of the potentiometer 36 and fed to input 41 of amplifier 23. When wiper 37 is at the left extreme of the resistor, namely position 38, the circuit oscillates at frequency of $f_1$. When wiper 37 is at the right extreme of the resistor, namely position 39, the circuit oscillates at frequency $f_2$. When wiper 37 is stationed between positions 38 and 39 the circuit oscillates at a frequency situated between frequency $f_1$ and $f_2$. If potentiometer 36 has a linear taper, the frequency of the signal at output 24 is varied linearly between $f_1$ and $f_2$ as sliding contact 37 is moved from left to right. The phase shift and amplitude characteristics of the positive or regenerative feedback voltage are depicted in FIG. 6. Note that the phase shift is zero for only one value of positive feedback voltage. As wiper 37 of potentiometer 36 is varied, the positive feedback voltage amplitude curve and the phase shift curve move simultaneously and horizontally between the frequency extremes, $f_1$ and $f_2$. The crux of the invention is the potentiometer 36 connected between the mid-points of the divider circuits so that the voltages at the ends of the potentiometer, which voltages are of different phase, are vectorially added at the slider contact 37. The voltage at contact 37 must be some function, such as the vectorial sum, of the two voltages at the ends of the potentiometer. Movement of contact 37 will change the ratio of the amplitudes of the two potentiometer-end voltages, and since these two voltages by definition are of different phases, the phase at 37 is a function of the position of 37. Since oscillator frequency is a function of the control grid phase, connected to contact 37, oscillator frequency is a function of the position of contact 37. The limits of the frequency range are $f_1$ and $f_2$ at the ends of the potentiometer. Thus, by adjusting the value of only one component, the frequency of the oscillator is made to vary smoothly over a large frequency range. It should be appreciated of course that potentiometer 36 may have any taper desired so that the frequency of the oscillator will vary as a chosen function of rotation of the potentiometer knob.

Nonlinear resistor 22 is used in order to stabilize the amplitude of the output voltage. If for any reason the output voltage from amplifier 23 increases, the increased voltage will be fed back to the voltage divider comprising resistor 21 and nonlinear resistor 22 via lead 46. As the current increases in nonlinear resistor 22 the resistance of the resistor will increase and a greater negative feed-back voltage will be fed into amplifier 23 and resultantly reduce the amplitude of the output voltage from amplifier 23. In short, as the output of amplifier 23 increases, the degeneration on line 42 increases and tends to hold the output voltage at a nearly constant amplitude. The output amplitude can be further stabilized by placing one or more additional series-parallel circuits between positions 38 and 39 on potentiometer 36. FIG. 7 illustrates an exemplary circuit wherein an additional series-parallel circuit is connected to the potentiometer 36 midway between points 38 and 39 at junction 86. The resistance of $R_{81}$ is equal to the resistance of $R_{84}$ and the capacitance of $C_{82}$ is equal to the capacitance of $C_{83}$. The positive feedback voltage produced at junction 86 supports oscillation at a frequency $$\frac{f_1+f_2}{2}$$

$f_1$ and $f_2$ are defined above). Thus, $$R_{81}=R_{84}=\frac{R_{26}+R_{31}}{2}$$

and $$C_{82}=C_{83}=\frac{C_{27}+C_{32}}{2}$$

Figure 3:
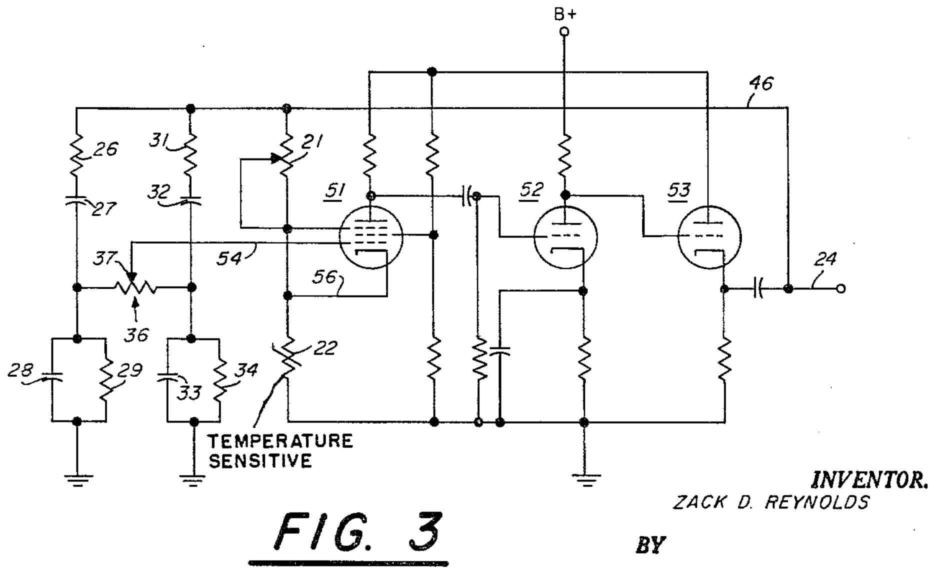
FIG. 3 shows schematically an oscillator in accordance with the invention.

FIG. 3 is a schematic diagram of an adjustable frequency oscillator in accordance with the invention. Pentode amplifier 51, triode amplifier 52 and cathode follower amplifier 53 are coupled together to form a non-inverting amplifier. The output of cathode amplifier 53 is fed back to the regenerative feedback network and the degenerative feedback network via lead 46. The positive feedback voltage derived from the regenerative feedback network is fed to the control grid of the pentode tube via lead 54. The negative feedback voltage derived from the degenerative feedback network, comprising resistance 21 and resistor 22, is fed to the cathode of the pentode via lead 56. Nonlinear resistor 22 comprises the cathode resistor of the pentode and as the pentode draws more current, the resistance of resistor 22 increases and the cathode of the pentode becomes more positive tending to reduce the current flow in the pentode. Resistor 21 is adjustable so that the amplitude of the negative feedback voltage may be varied.

The resistance of potentiometer 36 is preferably larger than the impedance of the elements in the series-parallel networks to prevent loading. Potentiometer 36 may be isolated from the series-parallel networks with follower circuits. FIG. 4 illustrates an exemplary circuit employing cathode followers. The junction of capacitor 27 and capacitor 28 is connected to the input of cathode follower amplifier 61 and the junction of capacitor 32 and capacity 33 is connected to the cathode follower amplifier 62. This arrangement reduces loading of the series-parallel networks and permits a low-resistance potentiometer to be used for potentiometer 36.

It should be understood that similar isolation circuit may be employed in feedback lead 46 if desired.

Potentiometer 36 may be replaced by other apparatus for deriving a feedback voltage from the series-parallel networks. For example, transformers with moving pick-up coils, or capacitive voltage dividers may be employed. FIG. 5 illustrates apparatus for electronically mixing the voltages from the two series-parallel networks. The apparatus of FIG. 5 is equipped with two pentodes 71 and 72. These pentodes are of the sharp cut-off variety, for example, 6SA6's. Resistor 74 functions as the cathode resistor for both tubes and resistor 76 functions as the load resistor for both of the pentodes. The first grid of pentode 71 is connected to the junction of capacitor 27 and 28 and the first grid of tube 72 is connected to the junction of capacitor 32 and 33. The third grid of tube 72 is grounded. A control voltage applied to input terminal 73 is fed directly to the third grid of pentode tube 71. This control voltage varies the mutual conductance of tube 71 and ultimately controls the mixing of the positive feedback voltages from the two series-parallel networks. With the control voltage sufficiently negative, tube 71 is cut-off and tube 72 amplifies the positive feedback voltage from the right series-parallel network. As the control voltage is made more positive, tube 71 turns on and conducts more and more. Finally, the cathode bias on tube 72 becomes great enough to cut off the tube. Then only the positive feedback voltage from the left series-parallel network is amplified. Of course, for control voltages between those two which cause cut-off, the feedback voltages from the two networks are proportionately mixed and fed to input 41 of the amplifier. When tube 71 is cut off, the oscillator oscillates at frequency $f_2$. When tube 72 is cut off, the oscillator oscillates at frequency $f_1$. As the feedback voltages are proportionately mixed, the frequency of oscillation proportionately varies between $f_1$ and $f_2$. Not only does this apparatus provide an efficient way of mixing the tap voltages from the two series-parallel networks it prevents loading of the series-parallel networks as the input impedance to the two pentodes is high.

Obviously many modifications and variations of the present invention are possible in the light of the above teachings. It is, therefore, to be understood that within the scope of the appended claims the invention may be practiced otherwise than as specifically described.

What is claimed is:

1. An adjustable frequency oscillator comprising an amplifier, said amplifier having an output electrode, an input electrode, and a common electrode, at least two voltage divider circuits coupled in parallel across the output electrode and common electrode of said amplifier, each divider circuit comprising two branches, one branch including a series resistance and condenser and the other branch including a parallel resistance and condenser, means coupled between the junctions of the branches of the plural divider circuits for mixing the voltages at the junctions in adjustable proportions, and means for applying the mixed voltages to said input electrode, the resistance-capacity of the divider circuits being different so that the oscillation frequency is a function of said adjustable proportion.

2. Apparatus in accordance with claim 1 wherein said mixing means comprises a potentiometer, said potentiometer having end terminals and a sliding contact, said end terminals being connected, respectively, to said junctions, said sliding contact being connected to the input electrode of said amplifier so that the oscillation frequency is a function of the position of said sliding contact.

3. Apparatus in accordance with claim 1 wherein said mixing means includes first and second sharp cut-off vacuum tubes each having at least first and second control grids, a cathode and an anode, a load resistor having first and second terminals, a cathode resistor having first and second terminals, said cathodes of said tubes being connected to said first terminal of said cathode resistor, said second grid of said second tube being connected to said second terminal of said cathode resistor, said second terminal of said load resistor being connected to said anodes of said tubes, a power supply having two outputs, said outputs being connected to said first terminal of said load resistor and said second terminal of said cathode resistor, respectively, said input electrode of said amplifier being coupled to said second terminal of said load resistor, means for generating a control voltage, said means for generating a control voltage being coupled to said second grid of said first tube, and said first grids of said tubes being coupled to said branch junctions for generating a regenerative feedback voltage to said amplifier.

4. An adjustable frequency oscillator comprising an amplifier, a resistance divider circuit connected across the output circuit of said amplifier, an intermediate point of said divider being connected to the input circuit of said amplifier to degeneratively feed back energy, second and third voltage divider circuits coupled in parallel across the output circuit of said amplifier, each divider circuit comprising two branches, one branch including a series resistance and condenser and the other branch including a parallel resistance and condenser, a potentiometer having two end terminals and a movable contact terminal, said end terminals being connected to the junctions of said branches of said divider circuits to mix the frequencies of the junctions, and said movable contact being connected to said input circuit of said amplifier to adjustably control regenerative feedback energy.

References Cited by the Examiner

UNITED STATES PATENTS 2,441,567 5/1948 Darlington ---------- 331—142

OTHER REFERENCES

Single-Valve A.F. Oscillator by Johnson in Wireless World, March 1948, pp. 82–84.

ROY LAKE, *Primary Examiner.*

JOHN KOMINSKI, *Examiner.*

J. B. MULLINS, *Assistant Examiner.*